(12) United States Patent  (10) Patent No.: US 8,960,845 B2
Benedicto et al.  (45) Date of Patent: Feb. 24, 2015

(54) COLOR ANALYSIS

(75) Inventors: Jordi Arnabat Benedicto, L'Arboc del Penedes (ES); Jan Morovic, Colchester (GB); Juan Uroz Soria, Terrassa (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 13/367,761

(22) Filed: Feb. 7, 2012

(65) Prior Publication Data
US 2013/0201244 A1  Aug. 8, 2013

(51) Int. Cl.
*B41J 29/393* (2006.01)
(52) U.S. Cl.
USPC .......... 347/19; 347/5; 347/9; 347/14; 347/16; 358/1.9; 399/41; 399/74
(58) Field of Classification Search
USPC .......................................................... 347/19
See application file for complete search history.

(56) References Cited

U.S. PATENT DOCUMENTS

| 6,036,298 | A | * | 3/2000 | Walker | 347/19 |
| 6,873,431 | B1 | * | 3/2005 | Kohler et al. | 358/1.9 |
| 7,283,240 | B2 | | 10/2007 | Mestha | |
| 7,588,302 | B2 | | 9/2009 | Bastani | |
| 7,676,166 | B2 | * | 3/2010 | Saida et al. | 399/49 |
| 7,705,293 | B2 | | 4/2010 | Miyahara | |
| 7,865,095 | B2 | | 1/2011 | Kakutani | |
| 7,946,700 | B2 | | 5/2011 | Rufes | |
| 2005/0260004 | A1 | * | 11/2005 | Maebashi et al. | 399/15 |
| 2006/0092210 | A1 | * | 5/2006 | Maniam et al. | 347/19 |
| 2007/0291291 | A1 | * | 12/2007 | Vilar et al. | 358/1.9 |
| 2009/0109269 | A1 | * | 4/2009 | Rufes et al. | 347/102 |
| 2010/0284009 | A1 | | 11/2010 | DiCarlo | |
| 2011/0032526 | A1 | * | 2/2011 | Gottwals et al. | 356/405 |

FOREIGN PATENT DOCUMENTS

DE 102007015741 9/2008
JP 2009053346 3/2009
WO 2011084158 7/2011

OTHER PUBLICATIONS

English text translation of JP2009-053346 to Yuuho Ho, accessed on AIPN website and attached as PDF.*

* cited by examiner

*Primary Examiner* — Manish S Shah
*Assistant Examiner* — Jeremy Delozier
(74) *Attorney, Agent, or Firm* — Hewlett-Packard Patent Department

(57) ABSTRACT

Techniques related to color analysis are disclosed herein. In an example, substrate locations on a printed pattern are selected based on a set of measurements related to substrate-height. Further, color of the printed pattern is determined at the selected locations.

25 Claims, 8 Drawing Sheets

COLOR ANALYSIS

BACKGROUND

The colors produced by color printers can vary as a function of media type, ink, print heads, temperature, humidity, etc. To address color variation, color characterization instruments (e.g., spectrophotometers) and device characterization profiling tools (e.g. International Color Consortium (ICC) profiles) for devices such as printers may be created. Device characterization profiling facilitates proper color handling.

In order to create a printer color profile, a printing system may print a test color pattern. For example, a test color pattern may be printed including a plurality of color patches arranged in a predetermined pattern. A color measurement device (e.g., a spectrophotometer or a colorimeter) may scan the test color pattern, and the color measurements may be used to create a profile for the printer that can be used to insure printing colors in a consistent manner.

There is a variety of methods for analyzing colors printed on a substrate. Such methods include, for example, using a hand-held spectrophotometer including a wheel that contacts the color patches on the paper. The wheel is for maintaining a desired spatial relationship between the spectrophotometer and the paper. As the spectrophotometer is moved, the wheel measures the speed and direction of the movement while the spectrophotometer determines color on locations across the substrate.

In some other methods, a color sensor (e.g., a spectrophotometer or a colorimeter) is mounted in the paper path of the moving sheets in a printer to provide color measurements of the test color patches printed on the sheets as they pass the color measurement device. In such color analysis methods, the color sensor does not contact the paper. However, color sensors may be sensitive to sensor-to-substrate distance. Hence, factors such as variations in a paper's position or differences in media thickness may reduce color analysis accuracy. Some methods include adjusting the color sensor output for taking into account variations in the vertical position of substrate locations on which color is measured.

BRIEF DESCRIPTION OF THE DRAWINGS

In order that the present disclosure may be well understood, various examples will now be described with reference to the following drawings.

DETAILED DESCRIPTION

Figure 1:
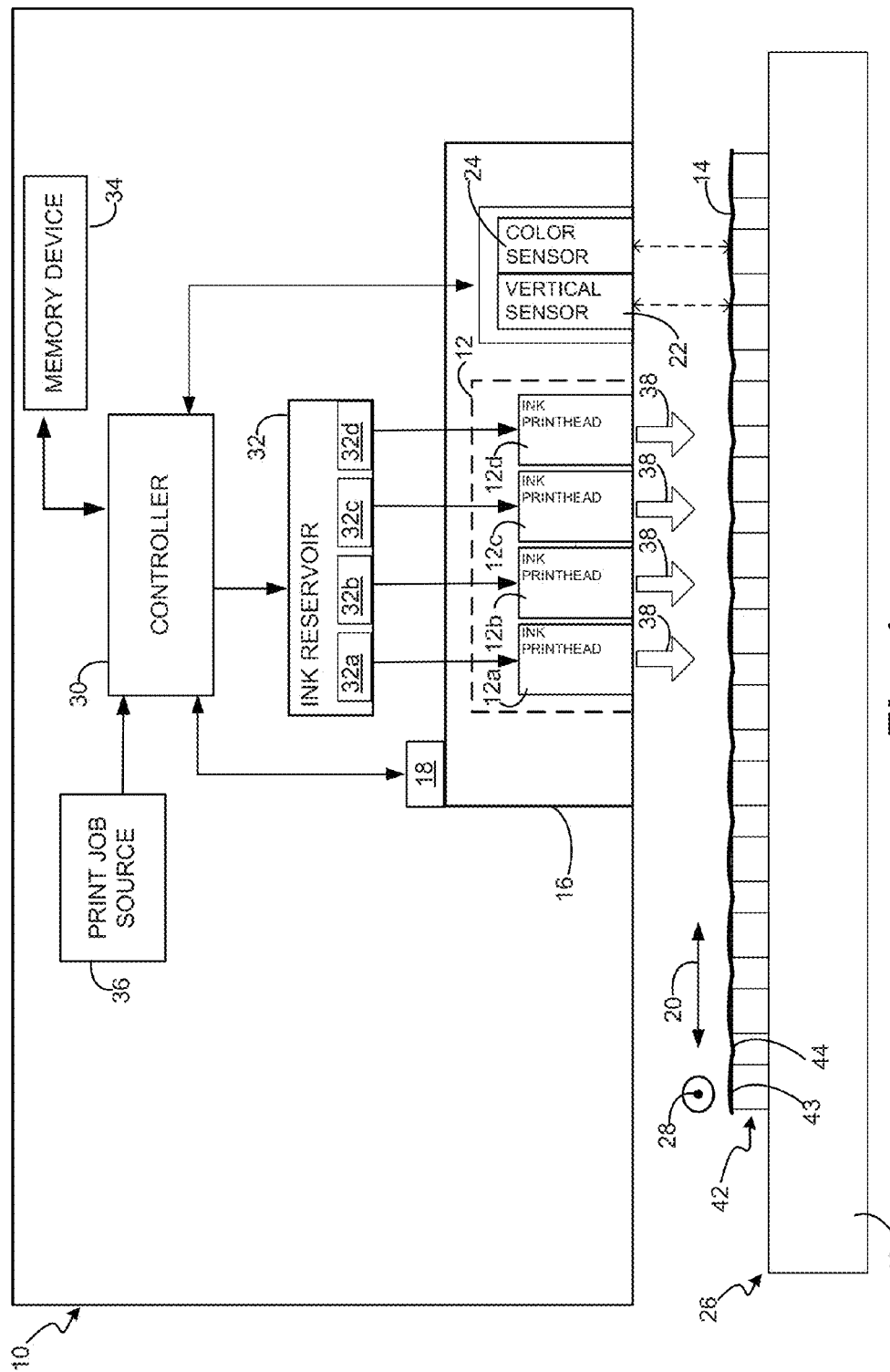
FIG. 1 is a block diagram of a printing system according to some examples.

In the following, numerous details are set forth to provide an understanding of the examples disclosed herein. However, it will be understood that the examples may be practiced without these details. Further, in the following detailed description, reference is made to the accompanying figures, in which various examples are shown by way of illustration. While a limited number of examples are illustrated, it will be understood that there are numerous modifications and variations therefrom. In the drawings, the dimensions of layers and regions are exaggerated for clarity of illustration. Like numerals are used for like and corresponding parts of the various figures.

As set forth above, there is a variety of methods for analyzing colors printed on a substrate. However, color analysis may still be insufficiently accurate for some specific applications. For example, in methods in which hand-held spectrophotometers are used, since the spectrophotometer device contacts the paper, it can distort a color test pattern thereby making a color measurement inaccurate. Further, in a method using a color sensor such as a spectrophotometer or colorimeter, since the color sensor does not contact the paper and color sensors may be sensitive to sensor-to-substrate distance, differences in media thickness or variations in a substrate vertical position may reduce accuracy of the color analysis. Although the color sensor output may be adjusted for taking into account substrate-height variations, further techniques may improve color analysis accuracy.

The present inventors have understood that convenient locations for performing color analysis may depend on different factors such as media type, used printer system, substrate tension, or amount of ink ejected on a substrate location to be analyzed. Further, some types of printing systems (e.g. wet ink printers) may be equipped with heating and/or vacuum generation for promoting ink drying; in such systems, drying temperature and/or vacuum may also influence which location is convenient for performing color analysis. These factors may cause variations in the sensor-to-substrate distance with respect to a color sensor. A varying sensor-to-substrate distance may cause that color measurements performed at different locations across the substrate are not consistent.

Techniques for color analysis are illustrated herein in which color measurement location may be dynamically selected taking into account substrate vertical position so as to reduce color measurement variability across the sensor scan axis caused by variations in the sensor-to-substrate distance. More specifically, according to some examples herein, color may be determined at selected locations on a printed pattern. The locations are selected based on measurements indicative of substrate vertical position (e.g., substrate-height measurements provided by a distance sensor or outputs of a sensor that is sensitive to sensor-to-substrate distance such as a densitometer). As used herein, a printed pattern refers to a form printed on a substrate. A printed pattern may include one or more color patches. Further, a printed pattern may be predetermined or generated dynamically during operation of a printing arrangement. In at least some examples herein, a printed pattern may be for color calibration of a printing arrangement.

Location selection based on measurements carrying information related to substrate vertical position facilitates reducing variability of color measurements caused by substrate-height variability at the locations where color is measured. For example, using substrate-height measurements, the pattern locations may be selected such that sensor-to-substrate distance associated with the selected locations is within a specific range. For example, the locations may be selected such that sensor-to-substrate distance corresponds to a nominal sensor-to-substrate distance (i.e., the specific distance, or distance range, at which the color sensor is designed to be operated). At least some of the examples herein facilitate that color measurements at different locations of a substrate are more consistent by reducing the influence of substrate-height variability in the location selection.

Figure 11:
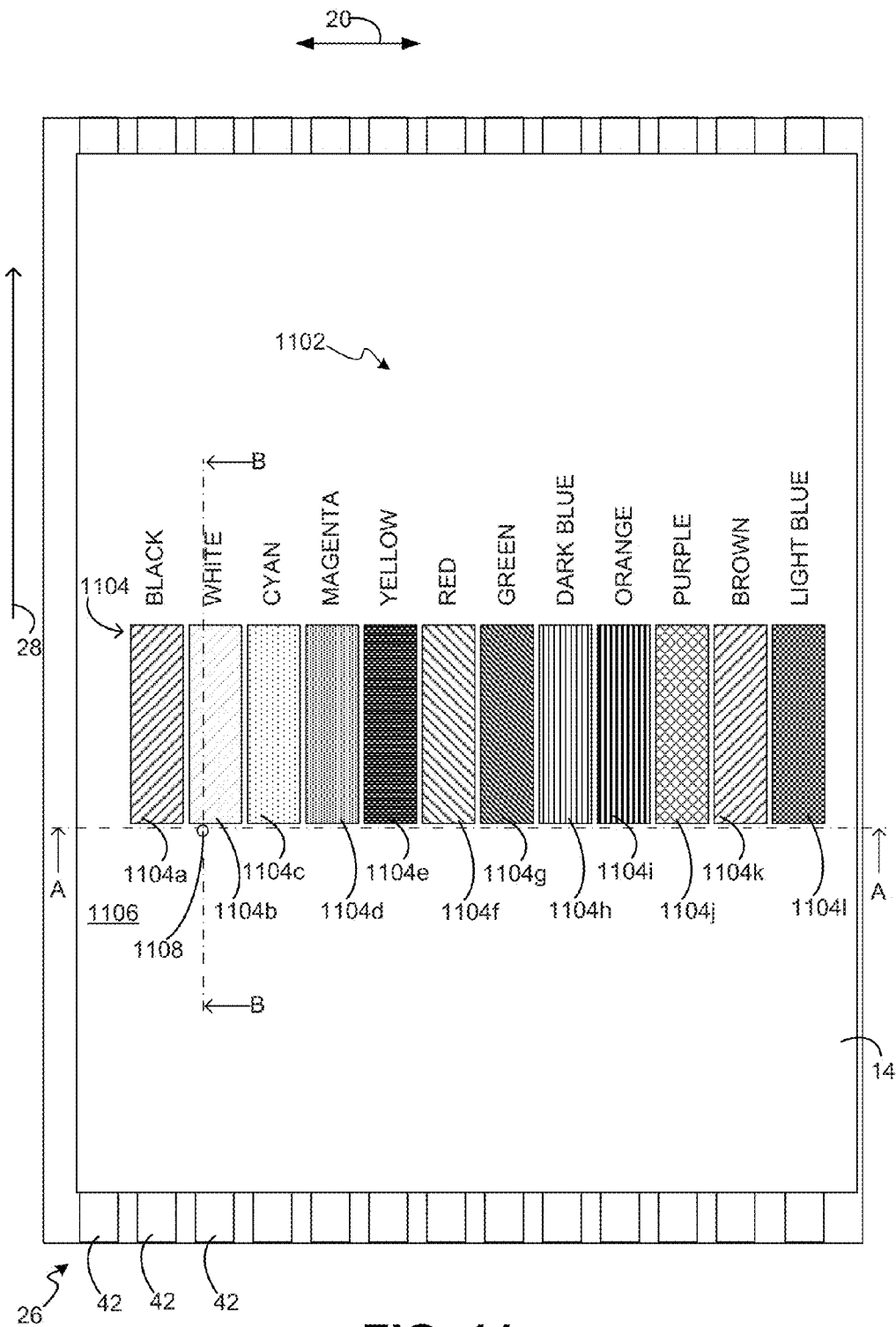
FIG. 11 is a top plan view that schematically depicts a substrate with a printed pattern on a substrate support.

FIG. 1 is a block diagram of a printing system 10 according to examples. Printing system 10 includes a printing arrangement 12 for printing a pattern (not shown in FIG. 1, an example thereof is depicted in FIG. 11) on a substrate 14. A printing arrangement refers to any arrangement suitable to print a pattern (e.g., a pattern including one or more color patches) on a substrate. In examples, printing arrangement 12 is configured for inkjet printing. Printing arrangement 12 may be configured to implement other printing methods such as laser printing. In the illustrated example, printing arrangement 12 includes ink printheads 12a-12d for printing substrate 14. Further, printing arrangement 12 is provided mounted onto a carriage 16, which is operatively coupled to a carriage drive 18 for traversing along a transition direction 20. In the illustrated example, carriage 16 further supports a sensor 22, and a color sensor 24. Sensor 22 (hereinafter referred to as vertical sensor 22) is configured for providing an output signal associated with vertical position of substrate locations. Some particular examples of a vertical sensor are given below with respect to FIGS. 2-4. Color sensor 24 is configured to provide a color output signal associated with color of the printed pattern.

Printing system 10 further includes a substrate support 26 on which substrate 14, or a portion thereof, lies while color sensor 24 is being operated. Substrate 14 may be advanced over support 26 in a media advance direction 28, which is perpendicular to the plane of the Figure. A controller 30 is configured for being operatively connected to the above elements of printing system 10 as well as an ink reservoir 32, a memory device 34, and a printjob source 36.

In the illustrated example, substrate support 26 is constituted by a platen that includes a base 40 and upstanding and spaced ribs 42. However, a substrate support as referred herein is intended to encompass any structure suitable to support a substrate or a substrate portion. As illustrated by the Figure, top portions 43 of ribs 42 are arranged to support substrate 14. A vacuum system (not shown) may be provided beneath platen base 40 for preventing buckling of substrate 14 towards printing arrangement 12 by sucking air from the spaces formed between ribs 42. A further illustration of ribs 42 is shown in FIG. 11. Ribs as referred to herein are intended to encompass any set of elongated structure suitable to support a substrate with spaces provided therebetween. The ribs illustrated in FIGS. 1 and 11 have a straight shape along media advance direction 28. However, ribs may be characterized by any shape such as a non-straight shape or, more specifically, a zigzag shape. Examples of a printer platen provided with ribs are illustrated in U.S. Pat. No. 7,946,700, which is incorporated herein by reference to the extent in which this document is not inconsistent with the present disclosure and in particular those parts thereof describing platen guides.

A substrate support including spaced ribs may be particularly convenient for wet ink printing systems. A wet ink printer is configured to use ink including a relatively high amount of water (e.g. a latex ink). As the wet ink contacts the print medium, water in the ink may saturate fibers of the used print medium (e.g., substrate 14) thereby causing the fibers to expand, which in turn may cause the print medium to buckle. Buckling, also called cockling, of a print medium tends to cause the print medium either to uncontrollably bend downwardly away from the printheads, or to uncontrollably bend upwardly toward the printheads. In either case, a constant pen-to-print medium spacing is not achieved, which might lead to poor print quality. Additionally, an upwardly buckling print medium may contact a printing arrangement (e.g., a printhead) disposed above the substrate. Therefore, upwardly buckling may lead to ink smearing on the print medium or even damage printer components.

A substrate support including spaced ribs facilitates preventing substrate buckling since rib spacing improves the drying of ink (which is particular important in wet ink printing) deposited on the substrate and reduces friction between the substrate and the support, thereby improving the drive of the print medium through the device. Further, rib spacings allows buckling of a substrate toward platen base 26 thereby preventing upwardly buckling towards printhead nozzles. A printing system, and in particular a wet ink printing system, may further include a heat source (not shown) for heating the substrate while supported by such a support for further promoting ink drying.

Figure 12:
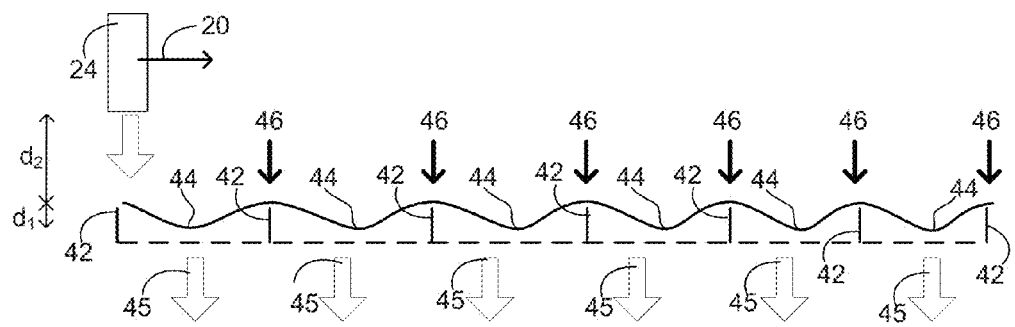
FIG. 12 schematically depicts an arrangement for determining color on a substrate.
Figure 15:
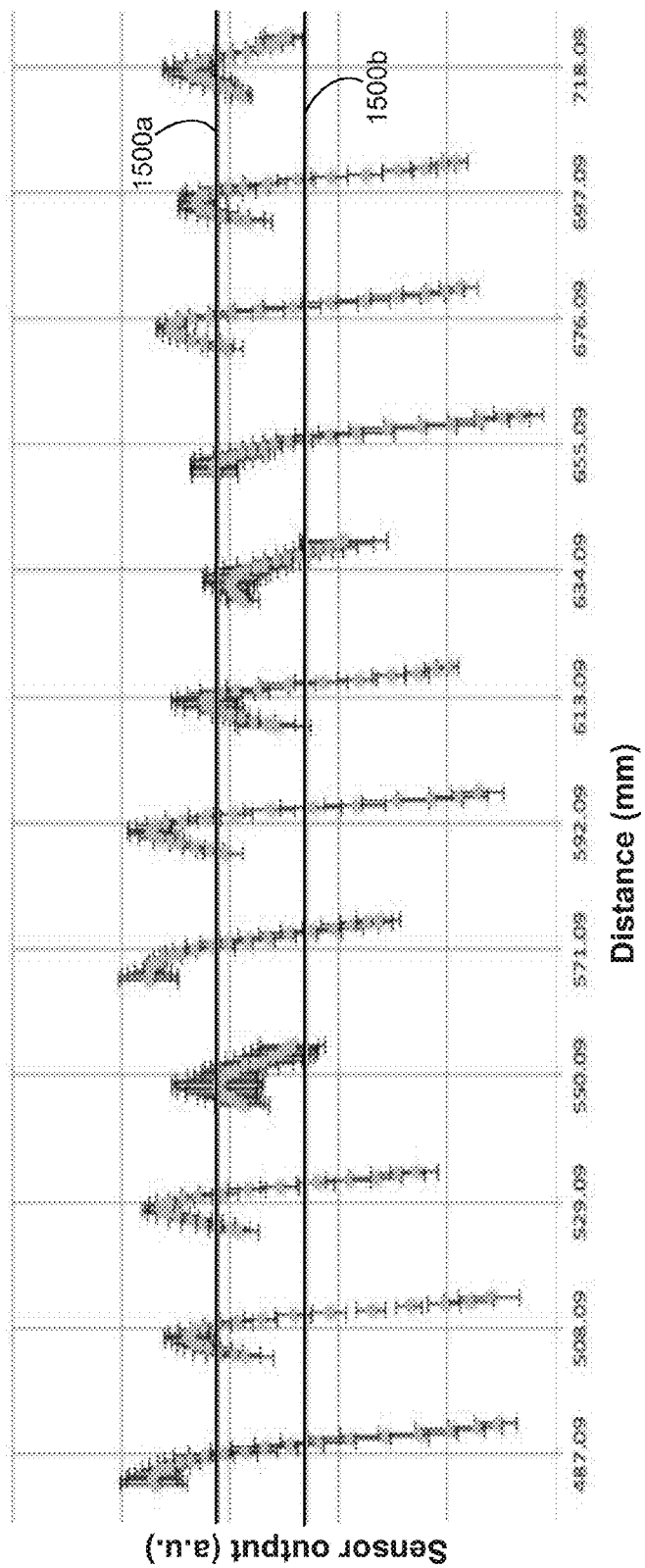
FIG. 15 depicts an output of an optical sensor according to examples herein.

However, as can be appreciated from FIGS. 1 and 12 as well as FIG. 11 in conjunction with FIG. 15, a substrate support including spaced ribs may induce substrate-height variations. More specifically, substrate buckles 44 may be formed towards the support base at the rib spacings. Due to the platen ribs, substrate deformation is induced towards spacings formed between ribs. Further, in some printing systems, the substrate is displaced along the ribs during placement of the substrate on the substrate support; such a displacement may induce a wave-formed deformation along the substrate that further promote buckling forming and that may be difficult to pre-determine. Moreover, vacuum 45 generated by a vacuum system for improving substrate adherence to the support may still further promote buckle formation. By way of example, buckle size (depicted in FIG. 12 by arrow $d_1$) may be between 0.5 and 1 mm such as 0.7 mm. Such a buckle size may be relatively significant when compared to the sensor-to-substrate distance (depicted in FIG. 12 by arrow $d_2$), which may be between 1.2 and 3.7 mm such as 2.7 mm.

In at least some printing systems, color calibration is performed while the substrate rests on a support including spaced ribs similarly as depicted in FIG. 12. In view of the relatively significant size of the buckles as compared to sensor-to-substrate distance, in such systems, substrate-height variation induced by the spaced ribs may render color measurement on different substrate locations inconsistent. Therefore, examples herein that facilitate addressing substrate-height variation during color calibration are particularly convenient for a printing system that includes a substrate support over which color calibration is performed, the substrate support including spaced ribs or any type of openings that allow deformation of the substrate towards a support base.

As used herein, a printhead is a device including nozzle or nozzles through which drops of a fluid can be ejected towards a substrate for performing printing. The particular fluid ejection mechanism within the printhead may take on a variety of different forms such as, but not limited to, those using piezoelectric or thermal printhead technology. In the illustrated example, each of ink printheads 12a-12d is configured to eject ink 38 of a different color (referred to as base colors). It will be appreciated that printing system 10 may include any number and configuration of printheads suitable for a particular application.

Ink printheads 12a-12d are fluidly connected to ink reservoir 32. Ink reservoir 32 includes separated reservoirs 32a-32d for providing ink to the respective ink printhead. In the illustrated example, reservoirs 32a-32d respectively store cyan ink, magenta ink, yellow ink, and black ink. Printing systems commonly employ a plurality of ink printheads to produce secondary colors by combining ink from different ink printheads. Base colors are reproduced on substrate 14 by depositing a drop of the required color onto a dot location. Secondary or shaded colors are reproduced by depositing drops of different base colors on adjacent dot locations; the human eye interprets the color mixing as the secondary color or shading.

Ink reservoir 32 may include disposable cartridges (not shown) for ink storage. Such reservoirs may be mounted on carriage 16 in a position adjacent to a respective printhead. In other configurations (also referred to as off-axis systems), a small fluid supply (ink or fixer) is provided to cartridges (not shown) mounted in carriage 16, each cartridge being associated to a respective printhead. In an off-axis system, flexible conduits are used to convey the fluid from the off-axis main supplies to the corresponding printhead cartridge. Printheads and reservoirs may be combined into single units, which are commonly referred to as "pens."

Controller 30 is configured to execute methods described herein. Controller 30 may be implemented, for example, by one or more discrete engines and/or modules (e.g., data processing components) that are not limited to any particular hardware, firmware, or software (i.e., machine readable instructions) configuration. More specifically, controller 30 may be configured to implement any of a location engine 502, a color acquisition engine 504, or a color calibration engine 506, which are illustrated below with respect to FIG. 5. Controller 30 may be implemented in any computing or data processing environment including digital electronic circuitry, e.g., an application-specific integrated circuit, such as a digital signal processor (DSP) or in computer hardware, firmware, device driver, or software (i.e., machine readable instructions). In some implementations, the functionalities of the engines and/or modules are combined into a single data processing component. In other versions, the respective functionalities of each of one or more of the engines and/or modules are performed by a respective set of multiple data processing components.

Memory device 34 is accessible by controller 30. Memory device 34 stores process instructions (e.g., machine-readable code, such as computer software) for implementing methods executed by controller 30, as well as data that controller 30 generates or processes to implement techniques described herein. Memory device 34 may include one or more tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices.

For printing a pattern on substrate 14, controller 30 may receive printjob commands and data from printjob source 36, which may be a computer source or other source of printjobs. Controller 30 typically determines a print mask from the received data. The print mask may be stored in memory device 34. Controller 30 is operatively connected to printing arrangement 12 and ink reservoir 32 to control ejection of ink 38 according to the print mask. Further, controller 30 acts according to the print mask to provide motion control signals to carriage drive 18 to traverse carriage 16 across substrate 14 (i.e., in transition direction 20).

Vertical sensor 22 encompasses any type of sensor suitable to provide an output signal associated with vertical position of substrate locations. A vertical position refers to a position on the substrate along an axis perpendicular to the substrate plane (i.e., a plane corresponding to a non-deformed substrate). It will be understood that substrate vertical position as used herein is with respect to a substrate portion facing printing arrangement 12. Further, a substrate location as used herein refers to a substrate portion facing printing arrangement 12. As used herein, substrate vertical position is directly correlated to substrate-height. Substrate vertical position may vary across a substrate due to, for example, a varying profile of the substrate supports, as illustrated with respect to FIGS. 1 and 12, or a varying substrate thickness.

Each of vertical sensor 22 and color sensor 24 may be constituted by a plurality of sensors cooperating for performing the functions described above. Generally, vertical sensor 22 and color sensor 24 are mounted such that the output of vertical sensor 22 corresponds to or is indicative of sensor-to-substrate distance with respect to color sensor 24. More specifically, the relative spatial configuration between vertical sensor 22 and color sensor 24 may be such that information associated with the sensor-to-substrate distance regarding color sensor 24 can be inferred from the signal output of vertical sensor 22. This information may enable to (a) directly infer an absolute value of the sensor-to-substrate distance (see, e.g., the example with respect to FIG. 2), or (b) infer a parameter correlated to sensor-to-substrate distance (e.g., the vertical signal output illustrated with respect to FIG. 4). Regarding (b), in some examples the relative position between vertical sensor 22 and color sensor 24 is registered so that information related to sensor-to-substrate distance with respect to color sensor 24 can be inferred from the output of vertical sensor 22.

In the example in FIG. 1, vertical sensor 22 and color sensor 24 are illustrated mounted on carriage 16. In other examples, vertical sensor 22 and color sensor 24 may be mounted on another part of a printing system, for example, on an additional carriage capable of performing scanning over substrate 14. Vertical sensor 22 and color sensor 24 may be mounted such that they can move independently from each other (e.g., by providing each sensor in independently movable carriages). In some examples, vertical sensor 22 and color sensor 24 are integrated within the same sensor system as illustrated with respect to FIGS. 2-4.

As set forth above, vertical sensor 22 is to provide an output signal associated with vertical position of substrate locations. Vertical sensor 22 may be a distance sensor such as an ultrasound sensor or an IR sensor arranged with a pre-determined spatial configuration such that the signal output of the vertical sensor enables to infer sensor-to-substrate distance of color sensor 24. For example, as depicted in FIG. 1, vertical sensor 22 may be arranged in the proximity of, or adjacent to, color sensor 24 and to translate conjointly therewith by mounting both sensors onto carriage 16.

As set forth above, color sensor 24 is to provide a color output signal associated with color of the printed pattern. A color sensor may be constituted, for example, by a spectrophotometer or a colorimeter. As further illustrated with respect to FIG. 2, color sensor 24 may be implemented in a sensor system that, additionally to colorimetry, is adapted to perform height measurements.

Figure 2:
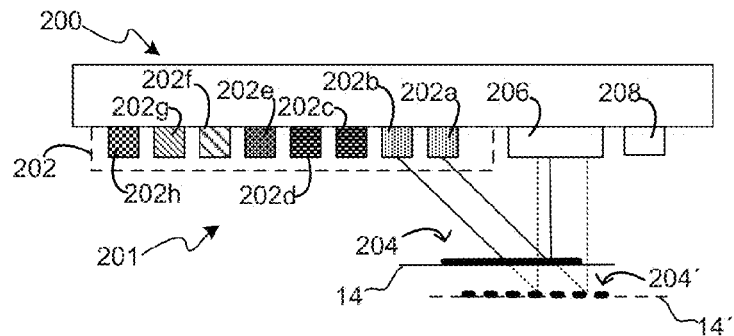
FIG. 2 is a block diagram of aspects of a printing system according to some examples.
Figure 3:
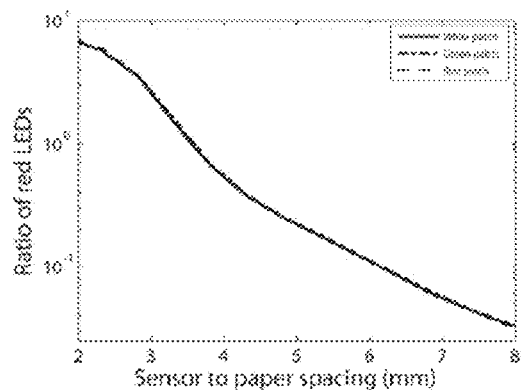
FIG. 3 illustrates ratios of measurements derived from the output of an optical sensor as illustrated by FIG. 2.
Figure 4:
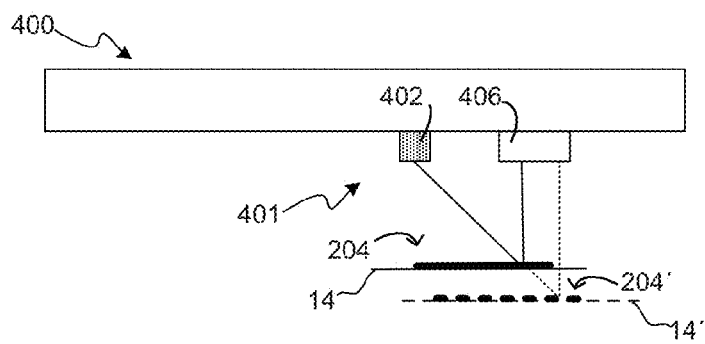
FIG. 4 is a block diagram of aspects of a printing system according to some examples.

As illustrated by FIGS. 2-4, vertical sensor 22 and color sensor 24 may be integrated in the same sensor system.

FIG. 2 illustrates further aspects of a printing system according to some examples. More specifically, in such examples, the printing system may include the following elements: (a) a first and a second spaced apart light sources that constitute a first set of light sources; (b) a first sensor configured to provide an output signal in response to reflected light received from the first and second light sources. This output signal is associated with vertical position of substrate locations. The first sensor may be operatively connected to a controller for receiving the output signal from the first sensor so as to extract information related to sensor-to-substrate distance with respect to the color sensor.

For example, as illustrated by FIG. 2, printing system 200 may include a sensor system 201 including the following elements: (i) a light emitting arrangement 202 that includes, at least, two light sources (e.g., two LEDs) 202a, 202b arranged to illuminate a substrate location 204 on substrate 14; (ii) an optical sensor 206 (e.g., a light-to-voltage converter) configured to (a) receive light emitted from light sources 202a, 202b and reflected by a substrate location 204 and (b) output a photo signal; and (iii) a calibration sensor 208. Substrate location 204 may correspond to a test patch on which color analysis is to be done. Optical sensor 206 may be positioned to capture diffuse light reflected from substrate location 204. Light sources 202a, 202b are configured such that the output of optical sensor 206 is indicative of substrate-height. More specifically, light sources 202a, 202b may be constituted by two LEDs that emit light having the same color, for example, but not limited to, red light having a nominal peak wavelength of 650 nm. Components of sensor system 201 are communicatively connected to a processor (e.g., a processor in controller 30) configured to (a) operate the light sources, and (b) receive and process the sensor outputs for implementing method described herein.

As illustrated by FIG. 2, light sources 202a, 202b are spaced apart from each other, and this spacing causes light emitted from each light source to reflect off of substrate location 204 differently. As the distance between light sources 202a, 202b and substrate location 204 varies, for example, between the substrate locations 204 and 204', these differences in light reflection causes the light pattern from each light source 202a, 202b to shift differently. Therefore, the output of optical sensor 206 with respect to light originated from light sources 202a, 202b depends on substrate-height.

By measuring the intensity of the reflected light from each light source 202a, 202b sequentially using optical sensor 206 and taking the ratio of the result, vertical position of a substrate location can be determined, as illustrated by FIG. 3. FIG. 3 illustrates the resulting ratios of measurements that can be derived from the output of a light sensor configured analogously as optical sensor 206 with respect to two spaced red LEDs configured analogously as light sources 202a, 202b. The depicted measurements are for three different patches: a white patch, a green patch, and a red patch. The ratio plot of FIG. 3 shows a direct correlation between (a) the ratio of the output signals of the light sensor ("ratio of red LEDs") for the two light sources and (b) the substrate-height ("sensor to paper spacing"). Since the LEDs are of the same color, this ratio does not change for differently colored patches or substrate types (assuming enough light is reflected from the patch). Thus, in accordance with certain examples, color analysis and, more particularly, selection of substrate location at which color is measured, is based on the ratio of reflected light received from the first light source to reflected light received from the second light source.

Therefore, light sources 202a, 202b in conjunction with optical sensor 206 may be used to implement a height-sensor. Such a height-sensor may be designed with a relatively fast response and relatively high spatial resolution; for example such a light sensor might be configured to take 100 readings per inch across 64 inches in less than 2 seconds. In order to compensate light source intensity drift over time, sensor system 201 may further include a calibration sensor 208 to measure change in intensity of, at least, light sources 202a, 202b. Sensor system 201 may further include a specular sensor (not shown) positioned relative to the light sources to capture the specular component of the reflectance. Such a specular sensor may be constituted by a further light-to voltage sensor provided at an outer position (relative to optical sensor 206).

According to some examples herein, determining a color may include illuminating the substrate at the selected locations with light, and measuring light reflected by the substrate at the selected locations using a color sensor. For example, light emitting system 202 may include further light sources that emit light of a different color than light sources 202a, 202b. More specifically, light emitting arrangement 202 may include a second set of light sources 202c, 202d that emit light of a color different than the color of light emitted by light sources 202a, 202b. This second set of light sources may be used to increase accuracy of the height measurement. In particular, since light reflected from the substrate location 204 varies depending on the color at that location, the intensity of the signal generated by optical sensor 206 depends on the emission color of the light sources. Therefore, for performing substrate-height measurements, the signal output from optical sensor 206 used to determine substrate-height may be chosen to correspond to one of the light source sets so as to improve sensor signal strength. Which light source set is chosen for the substrate-height measurement may depend on the color of the particular substrate location on which the height measurement is being performed.

Additionally, sensor system 201 may be operated to provide a color output signal associated with color of a pattern printed on substrate 14. In particular, sensor system 201 as shown may be operated as a colorimeter. More specifically, it can reproduce color measurements (XYZ values, LAB values, or spectral reflectance functions) that are valid for a set of predefined illuminants and ink/media combination. (In contrast thereto, measurements from a spectrophotometer are, generally, valid for any arbitrary illuminant.) Light emitting arrangement 202 may include further light sources for emitting light at different peak wavelengths across the visible spectrum.

To make a color measurement, light sources (e.g., LEDs) of different peak wavelengths may be operated in sequence; sensor outputs of light source 206 (and, optionally, for calibration sensor 208) may be recorded for each wavelength. These sensor outputs may be processed and turned into color data. In the depicted example, light source arrangement 202 includes four further light sources 202e-202h in addition to light sources 202a-202d so that light source arrangement 202 is capable of emitting light of six different colors for performing colorimetry. Light sources 202e-202h are specifically dedicated to colorimetry. Light sources 202a-202d are dedicated to both substrate-height determination and colorimetry.

Light emitting arrangement 202 may include any combination of light sources that enable to perform colorimetry and substrate-height determination as illustrated herein. For example, a light emitting arrangement is contemplated with a total of seven light sources, where two light sources are configured to emit light from the same color (e.g., light at 650 nm peak frequency), and five light sources are configured to emit light of different colors (e.g., light at 610 nm, 560 nm, 520 nm, 470 nm, and 450 nm).

According to some examples, the sensor configured to generate substrate-height information (e.g., vertical sensor 22 in the example of FIG. 1) includes, or consists of, a densitometer configured to provide the output signal associated with vertical position of substrate locations. A densitometer refers to a device that measures the degree of darkness (i.e., the optical density) at a substrate location. More specifically, a densitometer may be constituted as a reflection densitometer. As can be understood from FIG. 4, a densitometer output is correlated to sensor-to-sample distance. Therefore, a densitometer may be combined with a spectrophotometer, or any other suitable color sensor, for implementing color analysis techniques disclosed herein; the densitometer may provide the information related to substrate-height that can be used to select substrate locations for performing the color analysis.

Although substrate-height information that can be extracted from a densitometer may be relatively limited as compared to that from a distance sensor such as illustrated by FIGS. 3-4, a densitometer may be a convenient option for certain applications. More specifically, due to its simplicity, a densitometer may be implemented at a relatively low cost. Further, a densitometer may provide a relatively fast alternative for acquiring information related to substrate-height with a high spatial resolution. For example, a densitometer according to some examples may acquire 100 measurements per inch across 64 inches in less than 2 seconds.

An example of a densitometer that can be implemented in examples herein is specifically illustrated with respect to FIG. 4. A printing system 400 may include a sensor system 401 including, at least, the following elements: (i) a light source (e.g., a LED) 402 arranged to illuminate substrate location 204 on substrate 14; (ii) an optical sensor 406 (e.g., a light-to-voltage converter) configured to receive light emitted from light source 402 and reflected by test patch 204 and to output a corresponding photo signal. As can be appreciated from the Figure, the position at which light emitted from light source 402 meets optical sensor 406 depends on substrate-height. Since the light beam striking optical sensor 406 has a certain width, the sensor output is associated with vertical position of substrate locations (as far as the sensor is not in a saturated regime). In other words, a configuration of sensor system 401 as shown facilitates acquiring a set of measurements indicative of substrate vertical position of substrate locations.

Depending on the particular system, and in contrast with the system illustrated above with respect to FIGS. 2-3, the sensor output of optical sensor 406 cannot be used to directly infer an absolute substrate vertical position. However, the sensor output of optical sensor 406 might be sufficient for selecting substrate locations as described herein. In particular, substrate locations may be selected that correspond to a signal magnitude comprised within a certain range.

Sensor system 401 may be operated as follows to obtain substrate-height information related to a printed test pattern. For some applications, since the output of sensor system 401 may be color sensitive, a set of measurements indicative of substrate vertical position may be acquired at a non-printed area. For that reason, a pattern may be printed such that each color patch is adjacent to a non-printed area. For example the color patches may be printed forming rows with an adjacent non-printed area, as illustrated by FIG. 11. FIG. 11 depicts schematically a substrate 14 supported by substrate support 26. Substrate 14 is printed with a test pattern 1102 including a row of color patches 1104a-1104l arranged along a row 1104. For acquiring the set of measurements, a sensor scan (e.g., along line A-A depicted in FIG. 11) may be performed over a non-printed area 1106 adjacent to row 1104 of test patches 1104a-1104l while acquiring the output from optical sensor 406. Reading resolution of optical sensor 406 may be tuned to meet positioning accuracy of the color sensor.

In applications relating to a printing system including a ribbed platen, patches in a printed test pattern may be printed such that each patch is supported by at least a portion of a platen rib when the substrate is supported by the ribbed platen. For example, as illustrated by FIG. 11, each of patches 1104a-1104l may be printed such that each patch can be aligned with a ribbed when substrate 14 is supported by support 26. In view of the alignment between patches and ribs, a measurement at a certain position along line A-A (e.g., position 1108) can be correlated to substrate-height of color patch locations disposed across a line aligned with the rib directions (e.g, line B-B).

A set of measurements may be analyzed to infer information related to substrate vertical position. FIG. 15 depicts an example of the output of an optical sensor analogous to optical sensor 406 configured as depicted in FIG. 4. More specifically, FIG. 15 shows sensor signal corresponding to substrate location in the proximity of rib top portions. As illustrated by the Figure, since sensor system 401 is configured such that the output of optical sensor 406 is proportional to the light intensity received by the sensor, the higher the signal strength, the closer the paper to the sensor is.

In this example, location selection may be performed without determining a specific value of the sensor-to-substrate distance. For selecting substrate locations for color measurement, the intersection range of the measurements across all the patch spots may be computed. This intersection region is illustrated in FIG. 15 by lines 1500a-1500b. Then, for each test patch, a substrate location may be selected to perform the color measurement that coincides with the highest measurement of the intersection range. A similar graph may be obtained using a distance sensor, e.g., a height as illustrated with respect to FIG. 2. In this case, specific values of the substrate-height may be used to select substrate locations for color measurements.

In the previous example, the reason for acquiring the output signal associated with vertical position of substrate locations at a non-printed area is that, thereby, a uniformly colored surface is measured. More specifically, thereby the output signal from output sensor 406 is not influenced by substrate color at the positions where the substrate-height related measurements are acquired. By sensor acquisition at non-printed areas, a better correlation of the output of sensor 406 with substrate-vertical position can be obtained. The output signal associated with vertical position of substrate locations may also be acquired at printed locations, in particular if the vertical sensor is substantially insensitive to substrate color, as the case may be for the sensor system illustrated with respect to FIGS. 2-3 when operated for acquiring substrate-height information. Sensor system 401 may include further light sources (not shown) for implementing an integrated colorimeter in an analogous manner as described above with respect to FIG. 2.

Figure 5:
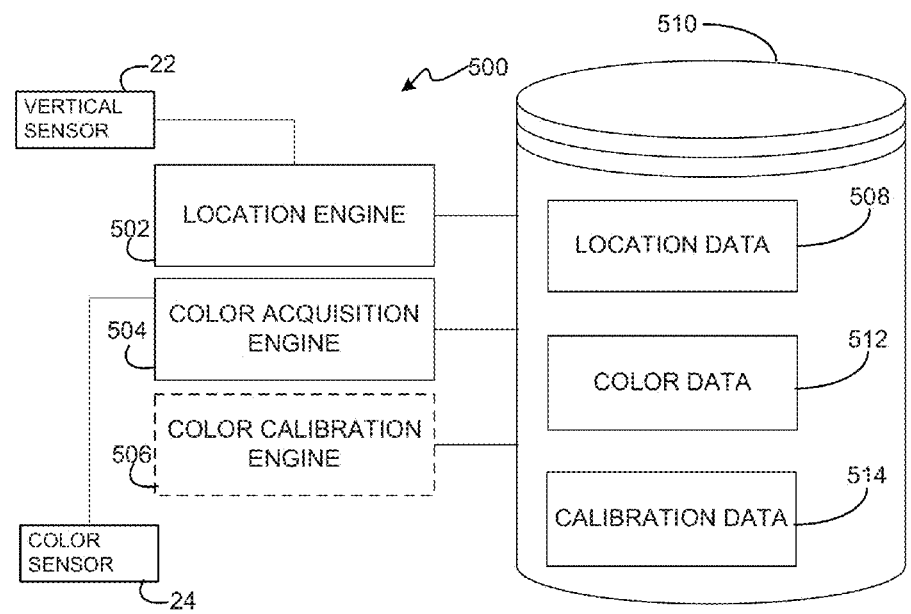
FIG. 5 schematically depicts a system according to some examples.
Figure 6:
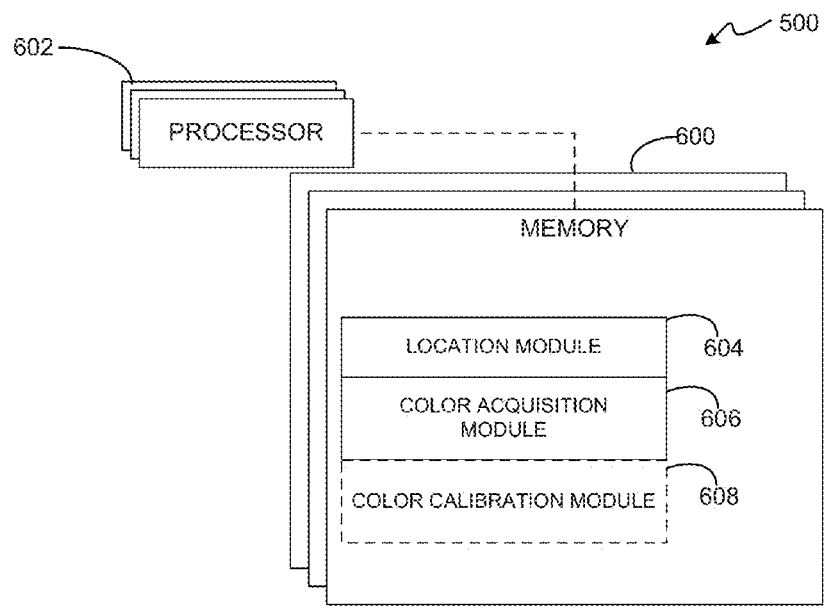
FIG. 6 is a block diagram depicting a computer readable medium according to some examples.

FIGS. 5-6 depict various examples of physical and logical components for implementing various examples. FIG. 5 depicts a system 500 for color analysis. System 500 may be integrated in a printing system. For example, system 500 may be implemented using controller 30 and memory device 34 depicted in FIG. 1. In other examples, system 500 may be implemented in a computing system communicatively connected to a printing arrangement for partially of completely performing the functionality described herein.

In the illustrated example, system 500 includes a location engine 502, a color acquisition engine 504, and, optionally, a color calibration engine 506. Location engine 502 is to select a location on a printed pattern (e.g., pattern 1102 depicted in FIG. 11) based on an output signal from a first sensor (e.g., vertical sensor 22 as exemplified in FIGS. 2-4). More specifically, the printed pattern may be a test pattern including a plurality of color patches as illustrated with respect to FIG. 11, whereby location engine 502 may be to select a sample location on a color patch. As illustrated by the Figure, location engine 500 may be communicatively coupled to vertical sensor 22. As further set forth below, the location selection is for facilitating determining which substrate locations are convenient for performing a color measurement thereby preventing variability due to substrate-height differences. In other examples, location selection may be used to filter color measurements so as to prevent variability caused by differences in substrate-height.

Locations selected by location engine 502 may be such that the vertical position of the location is comprised within a selected range. For example, location engine 502 may receive measurements associated with vertical position of locations across a substrate (e.g., measurements performed by the sensor systems illustrated above with respect to FIGS. 2-4 or any type of distance sensor). From the received measurements, location engine 502 may determine which substrate locations correspond to a substrate-height comprised within a certain range. For example, location engine 502 may directly determine substrate-height of the substrate locations if the first sensor is a distance sensor, e.g., a sensor system as shown in FIG. 2. More specifically, location engine 502 may be to select the location by determining vertical position of substrate locations using the output signal of the first sensor, the selected location corresponding to a substrate vertical position comprised within a selected distance range.

In other examples, location engine 502 may select substrate locations by processing an output signal without directly determining substrate-height, as illustrated above with respect to FIGS. 4 and 15. More specifically, location engine 502 may be to select a substrate location by determining whether a location is associated with an output signal of the first sensor comprised within a selected signal range. Location engine 502 may store data identifying selected substrate locations as part of location data 508 in data store 510.

In some examples, location engine 502 is configured to select the substrate location such that it corresponds to a nominal value of the color sensor to be used to determine color at the selected substrate location. The nominal value of the color sensor is the value, or range of values, of the sensor-to-substrate distance specified by the manufacturer to operate the color sensor. Selecting such substrate locations facilitates not only reducing measurement variability but also improving reliability of the measurements.

As set forth above and illustrated by FIGS. 1 and 11, a printing system may include a substrate support for supporting a substrate during operation of a color sensor for acquiring color printed on the substrate. Such a substrate support may include spaced ribs 42 with top portion arranged for supporting the substrate. If system 500 is deployed for such printing systems, location engine 502 may be configured to select a pattern location aligned with a rib top portion. More specifically, location engine 502 may determine from measurements which portions of the substrate are aligned with a rib portion. For example, location engine 502 may perform this determination from the data shown in FIG. 15 or from specific values of substrate-height. Selecting substrate location on rib top portions facilitates reducing influence of substrate-height variability in the color measurement. The relative spatial configuration between ribs top portions and color sensor may be chosen such that substrate portions on the ribs are placed at a nominal sensor-to-substrate distance. Therefore, such a selection may further facilitate reliability of the color measurements.

Color acquisition engine 504 is for determining color of a printed pattern at a location (or locations) selected by location engine 502. Color acquisition engine 504 may perform the color determination from a color output signal of a color sensor such as color sensor 24. As shown in the Figure, color acquisition engine 504 may be communicatively coupled to color sensor 24. Color acquisition engine 504 may store data related to determined colors as part of color data 512 in data store 510.

Color acquisition engine 504 may facilitate color determination by operating a color sensor to generate a color signal output associated with color of the determined sample location. More specifically, color acquisition engine 504 may cause a color sensor for performing color measurements at positions selected by location engine 502. For performing this task, color acquisition engine 504 may operate a carriage (e.g., carriage 16) onto which the color sensor is mounted to translate the color sensor while causing the color sensor acquire color measurements at locations across the substrate.

In some other examples, color acquisition engine 504 may determine color at the selected locations in conjunction with location engine 502 by (i) causing and/or receiving color measurements registered with substrate-height at which the color measurements are performed, and (ii) filtering out color measurements on the basis of the substrate-height values (e.g., by retaining color measurements that correspond to substrate-height values comprised within a range).

Color calibration engine 506 is to perform color calibration of a printing arrangement used to print the printed pattern. The color calibration is based on colors determined by color acquisition engine 504 at a location selected by location engine 502. Color calibration using a selected substrate location as described herein prevents that substrate-height variability affects the calibration results. Color calibration using a selected substrate location as described herein prevents that substrate-height variability affects the calibration results. Color calibration refers to measuring and/or adjusting color response of a printing system. Adjustment may be performed such that color response corresponds to a known state (e.g., a color standard). Color calibration using a selected substrate location as described herein prevents that substrate-height variability affects the calibration results. It will be understood that a variety of color calibration methods may be used depending on the particular application of the color analysis. For example, color calibration may include establishing a known relationship to a standard color space.

The components described above with respect to FIG. 5 are implemented as combinations of hardware and programming. Such components may be implemented in a number of fashions. As depicted in FIG. 6, the programming may be processor executable instructions stored on a tangible memory media 600 and the hardware may include a processor 602 for executing those instructions. Memory 600 can be said to store program instructions that, when executed by processor 602, implement system 500 of FIG. 5. Memory 600 may be integrated in the same device as processor 602 or it may be separate but accessible to that device and processor 602. In an example, memory 600 and processor 602 are implemented in a printing system, such as printing system 10, namely, as part of memory device 34 and controller 30. In other examples, memory 600 and processor 602 are implemented in a computing system communicatively coupled to a printing system for implementing the functionality described herein.

Examples of system 500 can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

In one example, program instructions can be part of an installation package that can be executed by processor 602 to implement system 500. In this case, memory 600 may be a portable medium such as a CD, DVD, or flash drive or a memory maintained by a server from which the installation package can be downloaded and installed. In another example, the program instructions may be part of an application or applications already installed. Here, memory 600 can include integrated memory such as a hard drive.

In FIG. 6, the executable program instructions stored in memory 600 are depicted as location module 604, color acquisition module 606, and, optionally, color calibration module 608. Location module 604, color acquisition module 606, and color calibration module 608 represent program instructions that when executed cause the implementation of, respectively location engine 502, color acquisition engine 504, and color calibration engine 506 of FIG. 5.

FIGS. 7-10 are flow diagrams that implement examples of methods for 3D printing of an object. In discussing FIGS. 7-10, reference is made to the diagrams of FIGS. 1-6 to provide contextual examples. Implementation, however, is not limited to those examples. Reference is also made to FIGS. 11-15. Again, such references are made simply to provide contextual examples.

Figure 7:
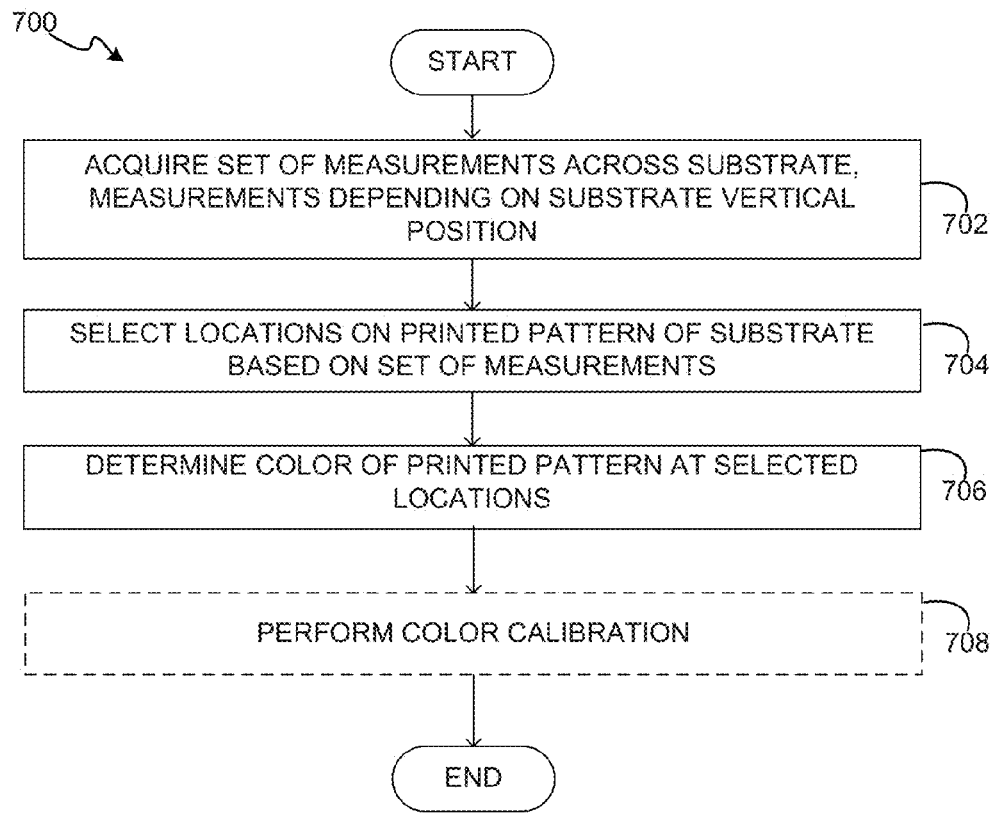
FIGS. 7-10 are block diagrams that implement examples of methods for color analysis.

Referring to FIG. 7, a block diagram 700 may include, at block 702, acquiring a set of measurements across a substrate including a printed pattern, the measurements being indicative of substrate vertical position. Referring back to FIG. 5, location engine 502 may be responsible for implementing block 702. More specifically, location engine 502 may (a) cause a vertical sensor (e.g., a distance sensor or a sensor that provides a signal related to substrate-height) to acquire the set of measurements, and/or (b) process the output of the sensor to gain access to an acquired set of measurements. The set of measurements are indicative of substrate vertical position of substrate locations.

A set of substrate-height measurements may include substrate-height measurements acquired using a sensor that enables directly inferring an absolute value of sensor-to-substrate distance (e.g., a distance sensor such as the example illustrated with respect to FIGS. 2-3 or an ultrasound sensor). In other examples, a set of measurements may be acquired using a sensor for acquiring a sensor output sensitive to substrate-height. As mentioned above, the sensor output must not necessarily enable directly determining an specific value of sensor-to-substrate distance; for example, a densitometer may be used as illustrated with respect to FIG. 4. FIG. 15, described above, is an example of an acquired sensor output; the graph indicates a correspondence between output level and substrate-height.

For implementing block 704, a sensor system (e.g., sensor system 201 or 401 depicted, respectively, in FIGS. 2 and 4) may be scanned across a substrate (see scan line A-A in FIG. 11 for an example) to generate a profile based on the sensor output (see FIG. 15 for an example of such a profile); the profile may correspond to, for example, signal level of the sensor output or determined substrate-height; from the profile, substrate locations may be selected for performing color acquisition.

Figure 8:
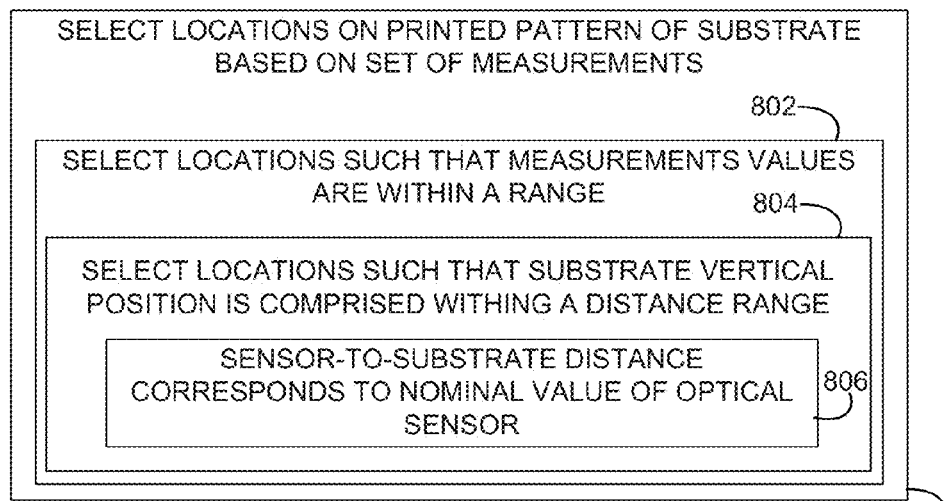

Block diagram 700 may further include, at block 704, selecting substrate locations on the printed pattern based on the set of measurements indicative of substrate vertical position. Referring back to FIG. 5, location engine 502 may be responsible for implementing block 704. FIG. 8 depicts sub-blocks that may be implemented for carrying out block 704. For example, block 704 may be implemented by, at sub-block 802, selecting locations corresponding to measurements values that are within a selected range.

Such a selected range may be pre-determined or selected dynamically. For example, a range may be selected depending on measured values in a particular implementation of the method such that differences in substrate-height are below a particular range (e.g., substrate regions that are comprised between lines 1500a-1500b in FIG. 15). As a further example, in systems including a ribbed platen, substrate locations on top rib portions might be identified from a profile obtained from the set of measurements at block 702. The latter approach may be particularly convenient if the top rib portions are positioned for complying with a nominal distance value of the color sensor.

As illustrated by sub-block 804, location selection may be performed such that substrate vertical position is comprised within a selected distance range. For implementing sub-block 806, substrate vertical positions may be determined based on an acquired set of measurements. For example, measurements may be acquired using optical sensor 206 during operation of any of light sources sets 202a-202b or 202c-202d; substrate vertical positions may be determined from this output using the LEDs ratios illustrated in FIG. 3.

In some examples, sensor-to-substrate distance with respect to a color sensor is used for implementing block 806. This might be implemented by associating the set of measurements acquired at block 702 with the sensor-to-substrate distance. For example, if vertical sensor 22 and color sensor 24 depicted in FIG. 1 are conveniently aligned, height measurements acquired using vertical sensor 22 may correspond directly (or, for example, by a transformation factor) to the distance between color sensor 24 and substrate 14. Alternatively to sub-block 804, location selection at block 704 may be performed without determining substrate vertical position by using the output signal of a sensor that is sensitive to substrate-height (e.g., a densitometer as illustrated with respect to FIG. 4); the selected location may then be chosen as corresponding to a substrate vertical position comprised within a selected signal range, as illustrated with respect to FIG. 15.

If substrate-height is determined from the set of measurements at block 702, substrate locations may be directly selected that are at a sensor-to-substrate nominal distance. More specifically, as illustrated by sub-block 806, and described above with respect to FIG. 5, location selection may be performed such that sensor-to-substrate distance (with respect to a color sensor used in implementing block 706) associated with the selected locations corresponds to a nominal value of the color sensor. Thereby, reliability of color measurements at block 706 may be improved.

Block diagram 700 may further include, at block 706, determining color of the printed pattern at locations at block 704. Referring back to FIG. 5, color acquisition engine 504 may be responsible for implementing block 706. Block 706 may include operating a color sensor (e.g., an ESP or a colorimeter) to provide a color signal output associated with color at the selected substrate locations. By way of example, as depicted in FIG. 12, color sensor 24 may be operated to acquire color only at selected locations 46. Locations 46 may be selected such that sensor-to-substrate distance is within a selected range. More specifically, using examples herein, color may be acquired only at locations that correspond to nominal sensor-to-substrate distance values of the specific sensor used to measure color. In the example illustrated in FIG. 12, selected locations 46 are aligned with top portions of ribs 42.

In some examples, location selection may be ignored when acquiring color; location selection may then be used to determine which acquired colors are to be used for a color calibration such as performed at block 708. In other words, location selection may be used to filter out color measurements to be used during color calibration.

Figure 13:
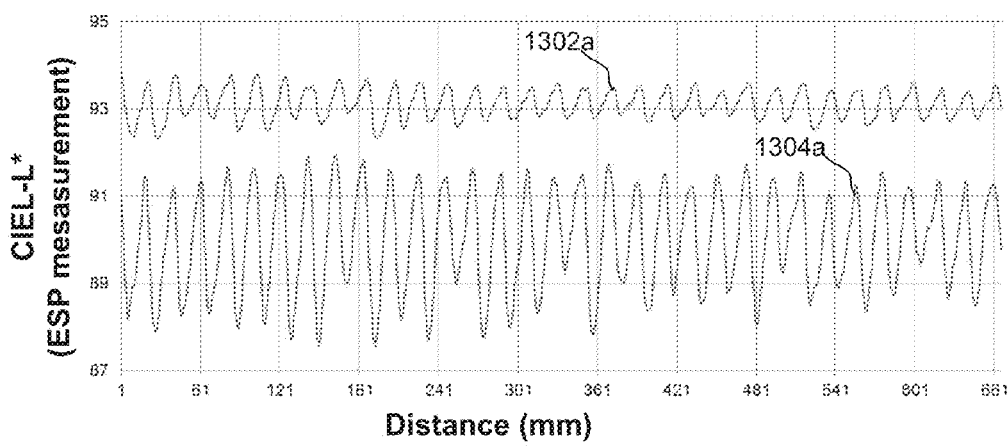
FIG. 13 shows a graph illustrating color measurements.
Figure 14:
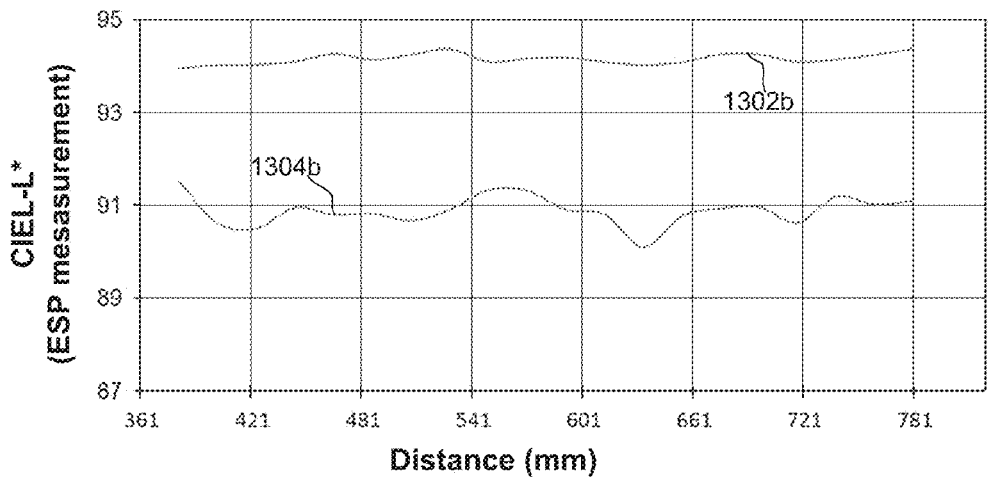
FIG. 14 shows a graph illustrating color measurements.

As illustrated by FIGS. 13-14, determining color of a printed pattern at selected locations facilitates improving color measurement quality (in particular measurement reliability) as compared to conventional methods. Both Figures are graphs showing ESP CIE-L* measurements across different substrates lying on a substrate support constituted by a ribbed platen: curves 1302a-1302b correspond to an Offset substrate; curves 1304a-1304b correspond to an 2 CIEDelta E1976 (or Euclidean distance in CIELabspace). FIG. 13 show color curves 1302a-1304a acquired using a conventional method. In contrast thereto, FIG. 14 show color curves 1302b-1304b acquired using substrate location selection as described herein for reducing substrate-height variability of locations on which color measurements are performed. As can be appreciated, color curves shown in FIG. 14 are characterized by a lower variability as compared with the color curves in FIG. 13. By way of example, substrate location selection may provide accurate color measurement with variability below 2 CIEDelta E2000. This may translate into a 4× reduction of measurement variability across printer platen as compared to other methods.

Block diagram 700 may further include, at block 708, performing a color calibration of a printing arrangement. Referring back to FIG. 5, color calibration engine 506 may be responsible for implementing block 708. For performing color calibration, a printed pattern may be used that includes a plurality of color patches suitable for calibrating the used printer. An example of such a printed pattern is illustrated above with respect to FIG. 11. When performing block diagram 700 using such a printed pattern, the substrate locations where color is determined at block 706 are selected to correspond to different color patches. For example, one location may be selected for each color patch. Based upon the selected locations, color may be determined for each patch. Using the color determination, the printer system used to print the pattern may be color calibrated using any method illustrated above with respect to FIG. 5.

Color calibration as described facilitates reducing color patch size as compared with some other methods in which substrate-height variability of color measurements is compensated by (i) measuring color at multiple locations within one color patch (e.g., 4 samples per patch), and (ii) averaging the multiple color measurements for the color patch. Acquisition at multiple locations generally implies a higher patch area. In contrast thereto, examples herein facilitate reducing substrate-height variability of color measurements using a single measurement per patch. Further, these other methods may require N patches for a specific substrate width W so that multiple measurements per patch and a useful average can be obtained; in contrast thereto, at least some examples herein may be performed such that 2N patches fit the same specific width W. Hence, substrate area (and length) required by at least some examples herein may require 35% of the substrate area required by at least some other methods.

As a further advantage, in at least some examples herein, the amount of ink and paper spent in printing a test color pattern can be reduced since patch size can be kept relatively small. Moreover, thereby the amount of time can be reduced since the time used to print and measure a test color pattern for color calibration can be kept relatively low. By way of example, a calibration target of 64 color patches may take 40 seconds using substrate selection compared to 2 min 25 sec of some other methods. As a further remark, at least some examples herein facilitates performing color calibration using color measurements at the nominal sensor-to-substrate distance specified for the color sensor. In contrast thereto, some other methods do not ensure that color calibration is performed at the nominal sensor-to-substrate distance specified for the color sensor, thereby, compromising calibration reliability.

Figure 9:
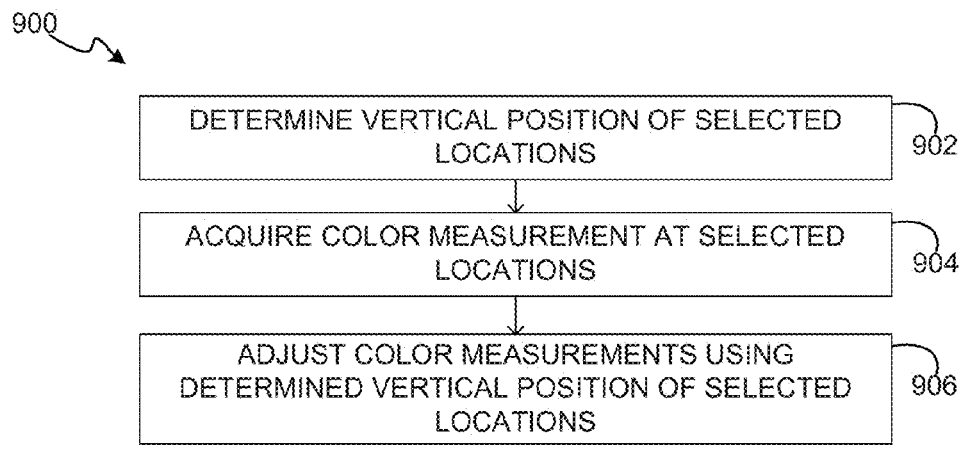

According to some examples, color measurements may be adjusted using measurements associated with substrate vertical position of the selected sample locations for compensating substrate-height variability. Generally, such an approach is performed using a previous characterization of how color measurements depend on substrate-height. FIG. 9 depicts a further block diagram 900 that implements such examples of methods for color analysis using color measurement adjustment. At block 902, a vertical position of a selected location may be determined. For example, a distance sensor as illustrated above with respect to FIG. 9 may be used for the height determination. The same height measurements used for selecting substrate location may be used for implementing block 902. At block 904, a color measurement may be acquired at selected locations. Block 904 may be implemented analogously to block 706 illustrated with respect to FIG. 7. At block 906, the color measurement acquired at block 904 may be adjusted using the vertical position determined at block 902. Block diagram 900 may be performed for all color measurements used for a color calibration as described herein.

A variety of methods may be used for implementing block 906, i.e. the color measurement adjustment. For example, an adjustment matrix may be stored that correlates the following parameters: (a) adjustment factors; and (b) sensor-to-substrate distances; a substrate-height determined at block 902 may be associated with a corresponding sensor-to-substrate distance; the sensor-to-substrate distance may be used to identify an adjustment factor using the adjustment matrix; finally, a color measurement corresponding to the sensor-to-substrate distance may be adjusted by applying the adjustment factor. Some examples of methods for adjusting color measurements based on sensor-to-substrate distances are illustrated in US application with publication number US 2011/0032526, which is incorporated herein by reference to the extent in which this document is not inconsistent with the present disclosure and in particular those parts thereof describing color measurement adjustment.

Figure 10:
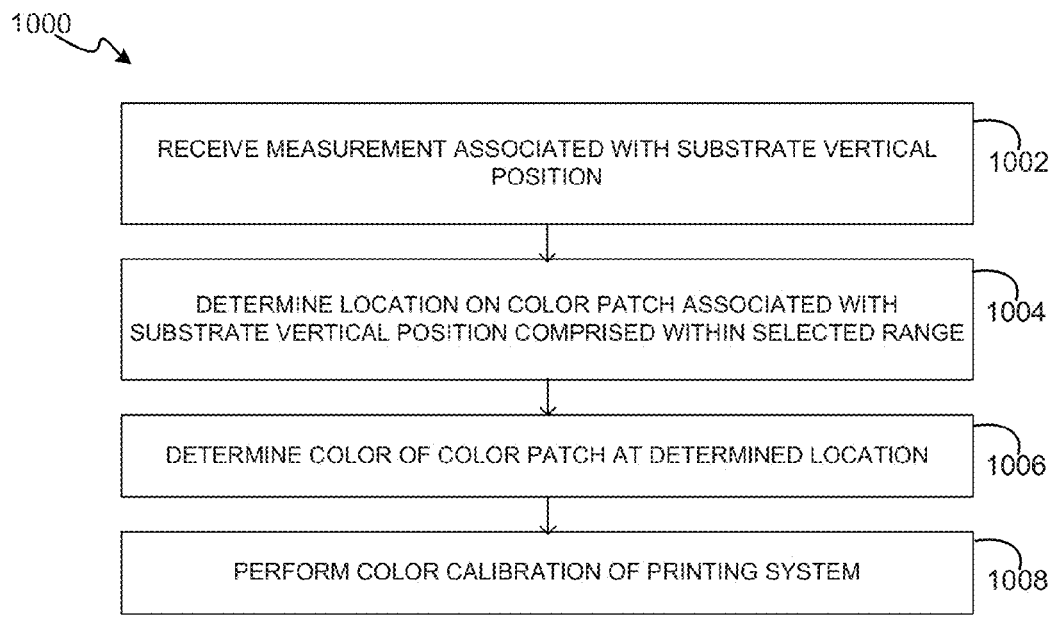

FIG. 10 depicts a further block diagram 1000 that implements further examples of methods for color analysis. At block 1002, measurements are received that are associated with vertical position of locations across a substrate. At block 1004, a sample location may be determined on a color patch printed on the substrate. This sample location is associated with a substrate vertical position comprised within a selected range (e.g., nominal distance values of a color sensor). Referring back to FIG. 5, location engine 502 may be responsible for implementing blocks 1002, 1004. At block 1006, color of the color patch at the determined sample location may be determined Color acquisition engine 504 may be responsible for implementing block 1006. At block 1008, a printing system used to print the color patch may be color calibrated. Color calibration is performed on the basis of the color at block 1006. Color calibration engine 506 may be responsible for implementing block 1008.

Further to the examples of methods described above, another color analysis method is contemplated including a) selecting a color measurement location based on a distance measurement indicative of sensor-to-substrate distance of the color sensor, b) operating a color sensor to measure color at a substrate location, whereby the selection is performed so as to reduce color measurement variability across a scan axis of the color sensor over the substrate.

In the foregoing description, numerous details are set forth to provide an understanding of the examples disclosed herein. However, it will be understood that the examples may be practiced without these details. For example, it will be understood that a substrate support as used herein is not limited to a ribbed platen and may be constituted by any suitable substrate support. Further, it will be understood that examples herein are not limited to wet ink printers. Further, it will be understood that substrate-height variability may be induced by a variety of sources such as, but not limited to, notches at the substrate support of or substrate uniformities. While a limited number of examples have been disclosed, numerous modifications and variations therefrom are contemplated. It is intended that the appended claims cover such modifications and variations. Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A printing system for printing on a substrate, comprising:
    a first sensor for providing output associated with vertical positions of respective substrate locations on the substrate;
    a color sensor for providing a color output signal associated with color of a pattern printed on the substrate;
    a location engine configured to select a location on the pattern from among the substrate locations, based on the output from the first sensor, the selecting based on a determination by the location engine that the output from the first sensor indicates that the vertical position of the selected location is within a selected range; and
    a color acquisition engine configured to determine a color of the printed pattern at the selected location from the color output signal of the color sensor.

2. The system of claim 1, wherein the location engine is configured to select the location by determining sensor-to-substrate distances of the substrate locations with respect to the color sensor using the output of the first sensor, the selected location corresponding to a sensor-to-substrate distance within a selected distance range.

3. The system of claim 1, wherein the location engine is configured to select the location by determining whether the selected location is associated with an output signal of the first sensor being within a selected signal range.

4. The system of claim 1, further comprising a substrate support for supporting the substrate during operation of the color sensor, the substrate support including spaced ribs with top portions of the ribs being arranged to support the substrate.

5. The system of claim 4, wherein the location engine is configured to select the location aligned with one of the rib top portions.

6. The system of claim 1, further comprising a color calibration engine configured to perform a color calibration based on the color of the printed pattern at the selected location.

7. The system of claim 1, wherein the first sensor and the color sensor are integrated together in a sensor system.

8. The system of claim 1, further comprising a wet ink printer for printing the pattern.

9. The system of claim 1, wherein the first sensor includes a densitometer configured to provide the output associated with the vertical positions of the respective substrate locations.

10. The system of claim 6, wherein the color calibration engine is configured to avoid use of color of the printed pattern at the substrate locations not selected by the location engine.

11. The system of claim 1, wherein the color acquisition engine is configured to avoid measuring color at the substrate locations not selected by the location engine.

12. The system of claim 1, wherein the vertical positions are based on distances along an axis between the first sensor and the substrate, the axis being perpendicular to a surface of a support for the substrate.

13. A non-transitory computer readable storage medium comprising instructions that, when executed by a processor, cause the processor to:
    receive measurements associated with vertical positions of substrate locations across a substrate;
    select, from among the substrate locations, a sample location on a color patch printed on the substrate, the selecting comprising identifying, based on the received measurements, at least one of the substrate locations that is associated with a vertical position within a selected range; and
    determine a color of the color patch at the selected sample location.

14. The medium of claim 13, further comprising instructions to perform color calibration of a printing system used to print the color patch, the color calibration being performed based on the determined color.

15. The medium of claim 13, wherein
    determining the color of the color patch includes operating a color sensor for generating a color signal output associated with color at the selected sample location, and
    selecting the sample location comprises selecting the sample location on the color patch that corresponds to a nominal sensor-to-substrate distance with respect to the color sensor.

16. The medium of claim 13, wherein determining the color of the color patch includes
    operating a color sensor for generating a color signal output associated with color of the color patch, and
    adjusting the color signal output using a received measurement associated with the vertical position at the selected sample location.

17. The medium of claim 14, wherein the color calibration avoids use of color of the color patch at the substrate locations not selected by the selecting.

18. The medium of claim 13, wherein determining the color avoids determining color at the substrate locations not selected by the selecting.

19. The medium of claim 13, further comprising instructions to:
Select, from among the substrate locations, a second sample location on the color patch, based on identifying that the second sample location is associated with a vertical distance within the selected range; and
determine a color of the color patch at the second selected sample location.

20. A color analysis method comprising:
acquiring a set of measurements by a sensor across a substrate including a printed pattern, the set of measurements being indicative of vertical positions of respective substrate locations across the substrate;
selecting, by a system including a processor, a substrate location from among the substrate locations on the printed pattern based on the set of measurements, the selecting comprising identifying, based on the set of measurements, a substrate location that is associated with a vertical position within a selected range; and
determining, by the system, a color of the printed pattern at the selected substrate location.

21. The method of claim 20, wherein
determining the color includes operating a color sensor to provide a color signal output associated with color at the selected substrate location.

22. The method of claim 20, wherein the printed pattern includes a plurality of color patches for color calibration of a printer, the method further comprising:
performing color calibration of the printer based on the determined color of at least one of the plurality of color patches.

23. The method of claim 22, wherein
the pattern is printed such that each color patch is adjacent to a non-printed area, and
the set of measurements indicative of the vertical positions includes measurements at the non-printed areas.

24. The method of claim 20, wherein
the substrate is supported by top portions of spaced ribs in a platen guide, and
the selected substrate location is at one of the rib top portions.

25. The method of claim 20, wherein the vertical positions are based on distances along an axis between the sensor along an axis and the substrate, the axis being perpendicular to a surface of a support for the substrate.

* * * * *